J. J. ELLIS.
Pruning-Shears.

No. 146,439.  Patented Jan. 13, 1874.

WITNESSES:
Jas. E. Hutchinson
E. H. Keiter

INVENTOR:
John J. Ellis
Edson Bro's.
Attorneys

UNITED STATES PATENT OFFICE.

JOHN J. ELLIS, OF WHITE HALL, ILLINOIS, ASSIGNOR OF ONE-HALF HIS RIGHT TO WILLIAM B. GRIMES, OF SAME PLACE.

IMPROVEMENT IN PRUNING-SHEARS.

Specification forming part of Letters Patent No. 146,439, dated January 13, 1874; application filed December 18, 1873.

*To all whom it may concern:*

Be it known that I, JOHN J. ELLIS, of White Hall, in the county of Greene and State of Illinois, have invented a certain new and useful Improvement in Pruning - Shears, of which the following is a full, clear, and exact description, reference being had to the annexed drawing, in which—

Figure 1:
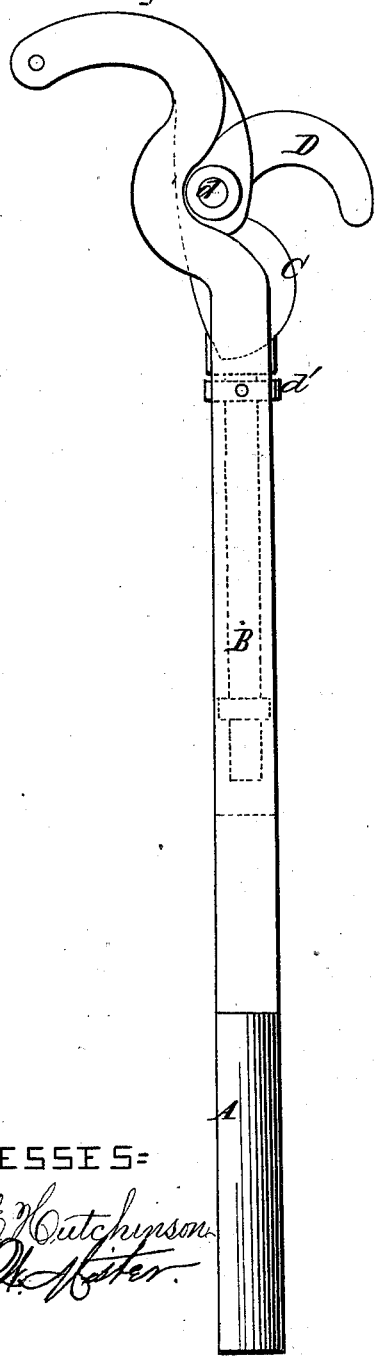
Figure 2:

Figure 1 is a side elevation of my improved pruning-shears, and Fig. 2 is a rear elevation of the same.

Corresponding parts in the two figures are designated by like letters.

This invention relates to a certain improvement in that class of pruning-shears in which a hook for grasping or taking hold of the limb to be cut is combined with a knife or blade, the two constituting the shears; and it consists in combining with such hook a movable head or nut and in encircling it with a swivel or pivoted ring, the axes of which have their bearings in bars attached to a staff, and in combining with such shears inverted S-shaped bars, to and between which the knife is fulcrumed, and which are used to remove the brush from the tree, &c., substantially as hereinafter more fully set forth.

To enable others to make and use my invention I will proceed to describe it.

In the annexed drawing, A refers to a staff for manipulating the shears, and to which are suitably secured two parallel bars, B. The bars B are formed at their upper ends with inverted S-shaped arms, the upper legs of which form hooks, with which to remove the brush or limbs cut from and catching in the tree, and the lower legs shoulders upon which are supported the projecting and nutted ends of the rivet or axis joining the parts of the shears proper, as shown in Fig. 1, the object of which is to hold said parts properly apart in readiness to receive the limb to be cut. C refers to the knife or blade, which is fulcrumed to and between the upper legs of the S-shaped arms of the bars B, and united to a hook in the form of shears by an axis or rivet, $d$, projecting laterally from the said knife and hook, and nutted. D is the hook last referred to, which takes hold of and holds the limb while the knife C cuts it. The straight arm of the hook passes down through a swivel or pivoted ring, $d'$, the axes of which have their bearings in eyes in the bars B, and are provided with a thread, beginning at a point thereon at $x$ and terminating at its extremity, upon which is fitted a nut or head, D', which, by reason of such thread, can be adjusted or moved thereon and be retained at any desired point of the thread. The office of the said head and ring is to prevent the hook D from leaving the bars B while the operation of pruning or cutting the limb is being performed. The object of making the head D' movable is to permit of the removal of the hook for sharpening the knife, and to regulate or lengthen the movement of the hook, which will, in turn, give the knife a greater sweep upon its axis, and thus, as the knife wears away by sharpening and use, such wear or reduction will be provided for by the additional sweep given the knife. By swiveling or pivoting the ring $d'$, it is adapted to adjust itself to the movement of the sliding hook so as to secure the easy and proper working of the said hook, and, consequently, lessen the friction between the two. The knife is caused to perform the operation of cutting or pruning the limb or branch by pulling downwardly on the staff A, the pressure thus imparted to the latter being transmitted to the hook and knife. After cutting the limb or branch, the knife and hook will return or fall to their original position, and separate by their own gravity in readiness for a second cutting.

Having thus described my invention, what I claim, and desire to secure by Letters Patent, is—

1. The hook D, of the shears proper, having the movable or regulating-head D' and encircled by the swivel or pivoted ring $d'$, the axes of which have their bearings in the bars B, substantially as and for the purpose set forth.

2. The bars B, having S-shaped arms, in combination with the shears C D, substantially as and for the purpose specified.

In testimony whereof I have hereunto signed my name this 12th day of December, 1873, in presence of two subscribing witnesses.

JOHN J. ELLIS.

Witnesses:
MARK MENERSTEIN,
B. B. HAMILTON.